(12) United States Patent
Boland

(10) Patent No.: US 10,457,251 B2
(45) Date of Patent: Oct. 29, 2019

(54) PACKAGING SYSTEM INCLUDING A HOLDER FOR HOLDING A WINDSCREEN WIPER DEVICE

(71) Applicant: FEDERAL-MOGUL S.A., Aubange (BE)

(72) Inventor: Xavier Boland, Arlon (BE)

(73) Assignee: Trico Belgium SA, Aubange (BE)

( * ) Notice: Subject to any disclaimer, the term of this patent is extended or adjusted under 35 U.S.C. 154(b) by 0 days.

(21) Appl. No.: 15/846,874

(22) Filed: Dec. 19, 2017

(65) Prior Publication Data
US 2018/0105143 A1  Apr. 19, 2018

Related U.S. Application Data

(62) Division of application No. 13/877,209, filed as application No. PCT/EP2010/064603 on Sep. 30, 2010, now Pat. No. 9,845,078.

(51) Int. Cl.
*B60S 1/38* (2006.01)
*B60S 1/40* (2006.01)
*B65D 85/00* (2006.01)

(52) U.S. Cl.
CPC .............. *B60S 1/40* (2013.01); *B60S 1/3808* (2013.01); *B65D 85/00* (2013.01); *B60S 1/381* (2013.01); *B60S 2001/3843* (2013.01); *B65D 2585/6885* (2013.01)

(58) Field of Classification Search
CPC ...... B60S 1/381; B60S 1/3812; B60S 1/3843; B60S 1/3808

USPC .......................................... 15/250.32, 250.43
See application file for complete search history.

(56) References Cited

U.S. PATENT DOCUMENTS

| | | | | |
|---|---|---|---|---|
| 3,545,028 A | * | 12/1970 | Poland | B60S 1/3801 |
| | | | | 15/250.48 |
| 9,950,694 B2 | * | 4/2018 | Boland | B60S 1/381 |
| 2009/0049638 A1 | * | 2/2009 | Jehannet | B60S 1/3848 |
| | | | | 15/250.32 |
| 2009/0217477 A1 | * | 9/2009 | Martinez | B60S 1/3801 |
| | | | | 15/250.32 |
| 2010/0230426 A1 | * | 9/2010 | Ku | B60S 1/38 |
| | | | | 220/735 |

FOREIGN PATENT DOCUMENTS

EP          1512593 A1 *  3/2005  ............ B60S 1/3848

* cited by examiner

*Primary Examiner* — Michael D Jennings
(74) *Attorney, Agent, or Firm* — Miller Canfield

(57) ABSTRACT

A system provided with a windscreen wiper device comprising an elastic, elongated carrier element, as well as an elongated wiper blade of a flexible material, which wiper blade includes at least one longitudinal groove, in which groove a longitudinal strip of the carrier element is disposed, wherein ends of the wiper blade and/or of the longitudinal strip are interconnected by a respective connecting piece, the carrier element biasing the wiper blade in a curved position, which windscreen wiper device comprises a connecting device for pivotally connecting an oscillating wiper arm thereto; a holder for holding the windscreen wiper device; with the special feature that the holder comprises a stiff tightening profile engaging the windscreen wiper device at engaging locations on the connecting device for tightening the windscreen wiper device in a less curved position.

5 Claims, 4 Drawing Sheets

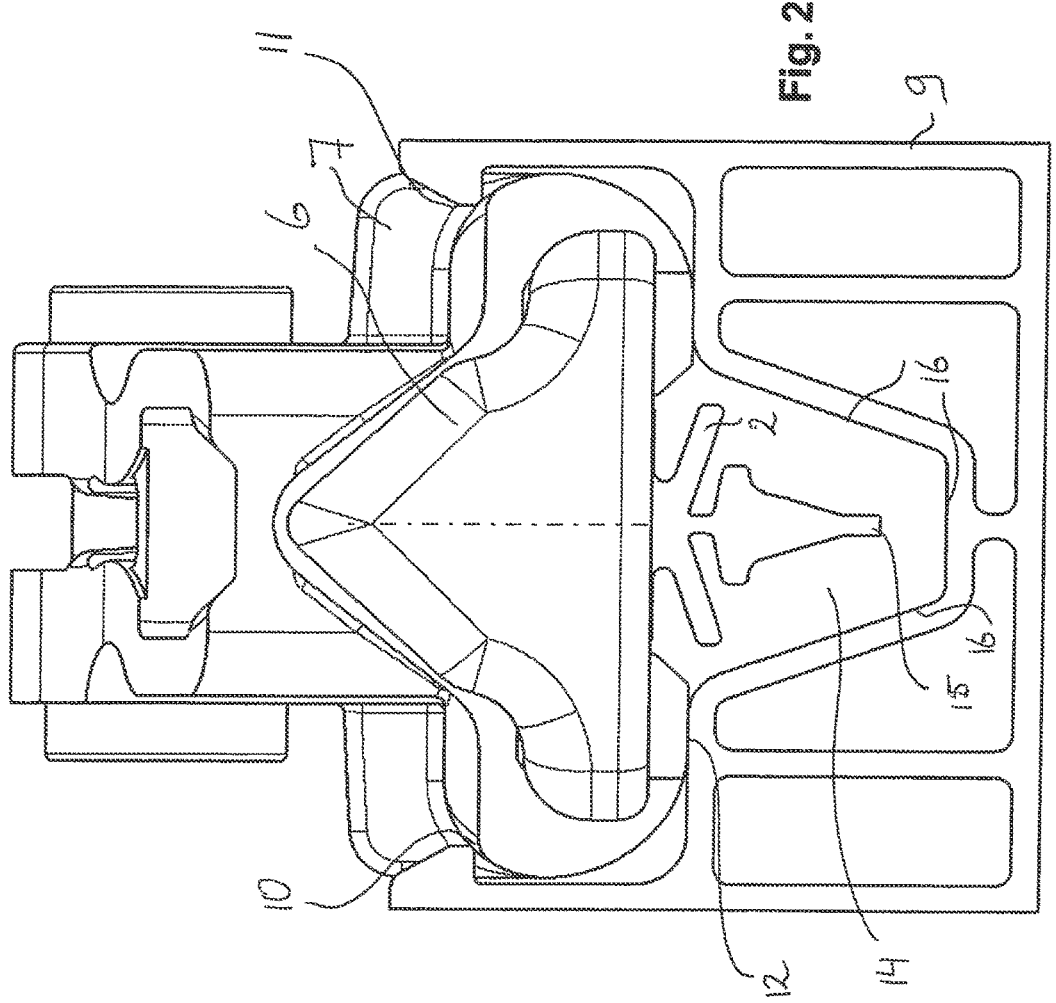

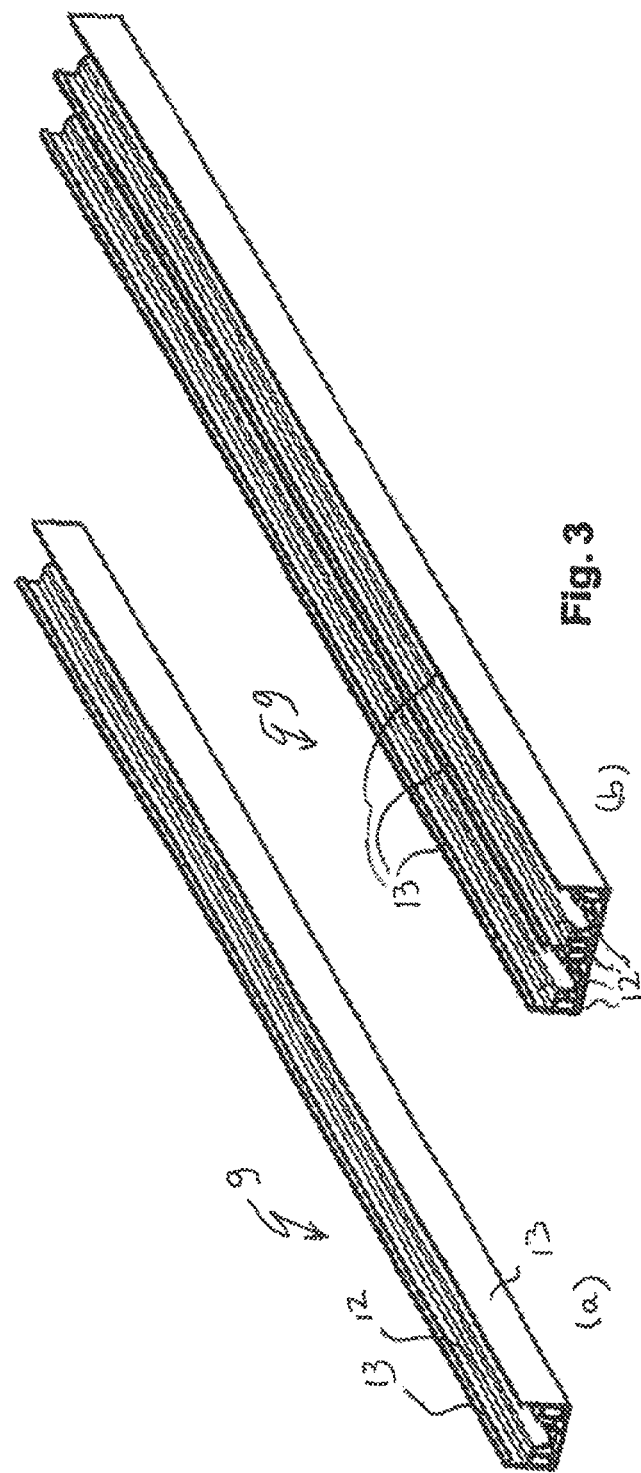

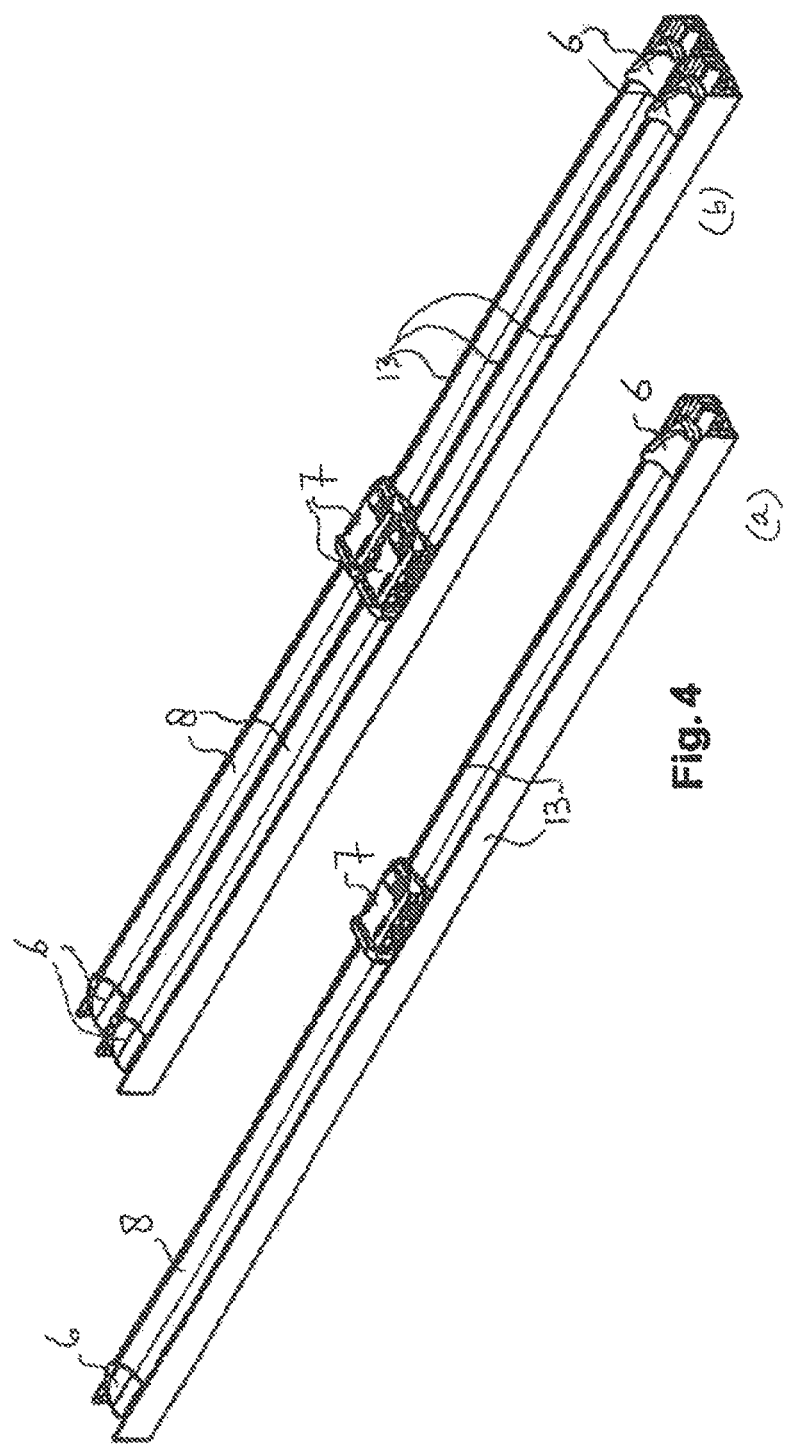

PACKAGING SYSTEM INCLUDING A HOLDER FOR HOLDING A WINDSCREEN WIPER DEVICE

CROSS REFERENCE TO RELATED APPLICATION

This U.S. Divisional Patent Application claims priority to U.S. Utility application Ser. No. 13/877,209 filed Apr. 1, 2013 which claims priority to International Application No, PCT/EP2010/064603, filed Sep. 30, 2010, and is incorporated herein by reference.

BACKGROUND OF THE INVENTION

1. Technical Field

The present invention relates to a system provided with a windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein ends of the wiper blade and/or of the longitudinal strip are interconnected by a respective connecting piece, the carrier element biasing the wiper blade in a curved position, which windscreen wiper device comprises a connecting device for pivotally connecting an oscillating wiper arm thereto near one end thereof; a holder for holding the windscreen wiper device.

2. Related Art

Such a system is generally known. The known system comprises a prior art windscreen wiper device particularly designed as a so-called "yokeless" wiper device, wherein use is no longer made of several yokes pivotally connected to each other, but wherein the wiper blade is biased by the carrier element, as a result of which it exhibits a specific curvature. The known system further comprises a holder in the form of a cardboard transport package for holding the prior art windscreen wiper device during transport.

One drawback of this known system is the fact that due its specific curvature the windscreen wiper device thereof cannot be inserted easily in the cardboard transport package, whereas once the windscreen wiper device is taken out the cardboard transport package it cannot be handled easily, for example in an outlet for display purposes.

SUMMARY OF THE INVENTION

An object of the invention is to overcome the drawbacks of the prior art as mentioned above, in particular to make it possible that the windscreen wiper device can be efficiently held during transport, storage and display.

In order to accomplish that objective, a system of the kind referred to in the introduction is characterized in that the holder comprises a stiff tightening profile engaging the windscreen wiper device at engaging locations on the connecting device and supporting the connecting pieces for tightening the windscreen wiper device in a less curved position. In other words, the stiff tightening profile as a separate constructional elongate element at least extending along the entire length of the windscreen wiper blade, grips the wiper blade at locations only on the connecting device, as well as supports the connecting pieces without damaging the longitudinal strip, for example. Particularly, the tightening profile engages the connecting device at the engaging locations laterally from the outside. More in particular, the tightening profile engages the connecting device at the engaging locations on both longitudinal sides from the outside. The tightening profile is made in one piece through extrusion or injection molding.

It is noted that the present stiff tightening profile can be used in combination with a package of cardboard, for example, wherein the package envelopes the windscreen wiper device equipped with the tightening profile. In the alternative, the present stiff tightening profile is used without such a package, so that the tightening profile solely acts as holder during transport, storage and/or display.

In one preferred embodiment of a system in accordance with the invention the tightening profile and the connecting device are interconnected at the engaging locations through a snapping or clipping operation. Preferably, the tightening profile comprises upwardly extending arms engaging the connecting device at the engaging locations, and wherein the arms are elastically or plastically deformable for snappingly interconnecting the tightening profile and the connecting device.

In another preferred embodiment of a system according to the invention the tightening profile comprises a support for supporting a bottom of the connecting device and a bottom of each connecting piece. Accordingly, the wiper blade is thereby stretched in a less curved (preferably flat) position.

In another preferred embodiment of a system in accordance with the invention the tightening profile comprises a hollow chamber extending in longitudinal direction therein for receiving a wiping lip of the wiper blade, wherein the wiping lip is located at a distance from walls of the profile defining the chamber. Hence, the wiping lip "hangs free" inside the hollow chamber, without making contact with any parts of the tightening profile, so that the wiping lip is not damaged at all at all times during transport, storage and/or display.

In another preferred embodiment of a system according to the invention the holder comprises two stiff tightening profiles each engaging a windscreen wiper device. Particularly, the two windscreen wiper devices mutually differ in length.

The invention also refers to a holder as defined in a system in accordance with the invention.

The invention also relates to a method for holding together for transport, storage and/or displaying at an outlet a windscreen wiper device comprising an elastic, elongated carrier element, as well as an elongated wiper blade of a flexible material, which can be placed in abutment with a windscreen to be wiped, which wiper blade includes at least one longitudinal groove, in which groove a longitudinal strip of the carrier element is disposed, wherein ends of the wiper blade and/or of the longitudinal strip are interconnected by a respective connecting piece, the carrier element biasing the wiper blade in a curved position, which windscreen wiper device comprises a connecting device for pivotally connecting an oscillating wiper arm thereto near one end thereof; using a holder for holding the windscreen wiper device; characterized in that the holder is provided with a stiff tightening profile engaging the windscreen wiper device at engaging locations on the connecting device for tightening the windscreen wiper device in a less curved position.

THE DRAWINGS

The invention will now be explained in more detail with reference to figures illustrated in a drawing, wherein:

FIG. 2 shows a cross-sectional view of the windscreen wiper device and the stiff tightening profile of FIG. 1 in assembled position;

FIG. 3 shows a perspective, schematic view of a single stiff tightening profile in accordance with the invention, arranged to hold one or two windscreen wiper devices of FIG. 1; and FIG. 4 shows a perspective, schematic view of the windscreen wiper device of FIG. 1 equipped with the stiff tightening profile of FIG. 3.

DETAILED DESCRIPTION

Figure 1:
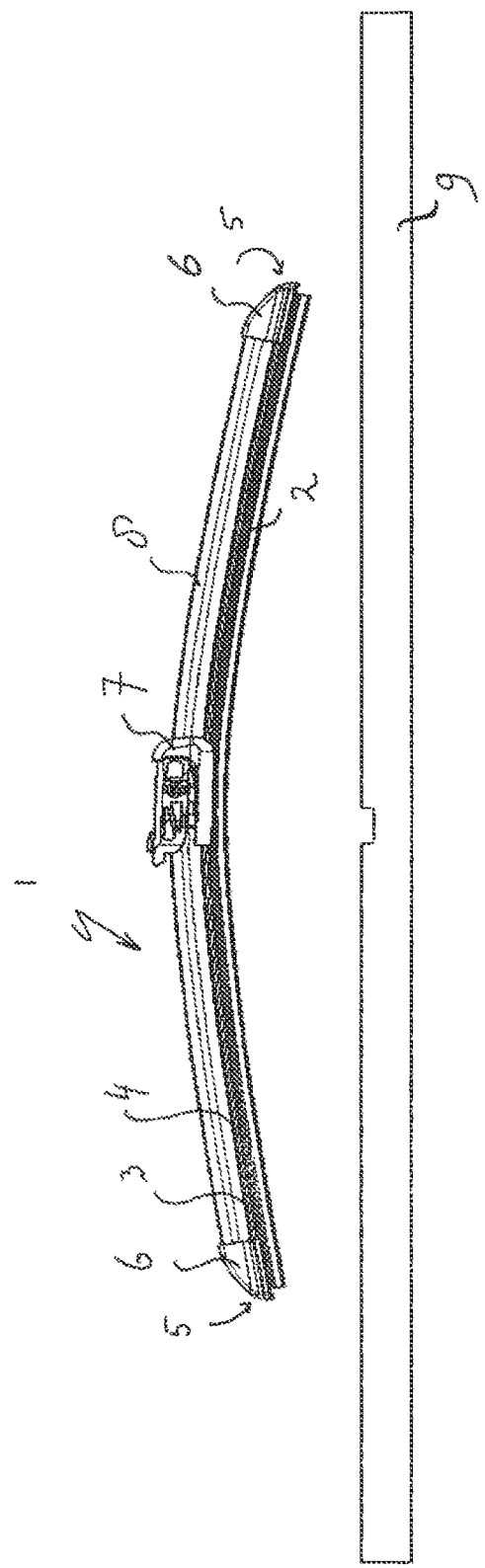
FIG. 1 is a schematic side view of a preferred embodiment of a windscreen wiper device and a separate stiff tightening profile according to the invention.

FIG. 1 shows a preferred variant of a windscreen wiper device 1 according to the invention. The windscreen wiper device is built up of an elastomeric wiper blade 2, in the longitudinal sides of which opposing longitudinal grooves 3 are formed, and of longitudinal strips 4 made of spring band steel, which are fitted in the longitudinal grooves 3. the strips 4 form a flexible carrier element for the rubber wiper blade 2, as it were, which is thus biased in a curved position (the curvature in operative position being that of a windscreen to be wiped). Neighbouring ends 5 of strips 4 are interconnected on either side of the windscreen wiper device 1 by means of connecting pieces 6. The windscreen wiper device 1 is further equipped with a connecting device 7 for an oscillating arm (not shown), and a spoiler 8.

With reference to FIGS. 2 through 5 a stiff tightening profile 9 made of one piece of plastic and extending along the entire length of the wiper blade 2 engages the connecting device 7 at engaging locations 10, 11 on longitudinal sides of the connecting device 7.

Simultaneously, the connecting device 7 and both connecting pieces 6 are supported at the location of their bottoms by supporting surfaces 12 of the tightening profile 9. As a result, the tightening profile 9 tightens the windscreen wiper device 1 in a less curved position (i.e. in a flat longitudinal plane).

As a matter of fact, the stiff tightening profile 9 arranged to hold one windscreen wiper device 1 (see FIGS. 3a and 4a) has a U-shaped cross-section, whereas each arm 13 of the U-shaped cross-section acts as engaging means in order to engage the connecting device 7 at the engaging locations 10, 11 and is elastically deformable in order to realize a snapping or clipping interconnection between the connecting device 7 and the tightening profile 9. In case the stiff tightening profile 9 is arranged to hold two windscreen wiper devices 1 (see FIGS. 3b and 4b), the stiff tightening profile 9 has a W-shaped cross-section with arms 13, wherein the connection device 7 of each windscreen wiper device 1 is gripped by two opposing arms 13 at the engaging locations 10, 11. Again, elastically deformability ensures a snapping connection between the connecting device 7 and the profile 9.

Along its entire length the tightening profile 9 comprises a hollow chamber or core 14 so as to accommodate a wiping lip 15 of the wiper blade 2. As shown, the wiping lip 15 is located at a distance from walls 16 of the profile 9 defining the chamber 14, so that the wiping lip 15 "hangs free" inside the hollow chamber 14. Safe transport, storage and/or display, without damage of the wiping lip 15, is then ensured at all times.

The invention is not limited to the embodiment shown, but extends also to other embodiments falling within the scope of the appended claims.

What is claimed is:

1. A method for supporting a windscreen wiper device comprising an elastic elongated carrier element and an elongated wiper blade of a flexible material that can be placed in abutment with a windscreen to be wiped, the wiper blade including at least one longitudinal groove including a longitudinal strip disposed therein, wherein opposing ends of the wiper blade and the longitudinal strip are interconnected by a respective connecting piece, the carrier element biasing the wiper blade in a curved position, and the windscreen wiper device including a connecting device for pivotally connecting an oscillating wiper arm thereto near one end thereof, said method including:

providing a holder for holding the windscreen wiper device, wherein the holder comprises an elongated structure extending the longitudinal length of the wiper device;

releaseably engaging the windscreen wiper device with the holder at engaging locations along opposing longitudinal sides of the connecting device, wherein the elongate structure and the connecting device are directly interconnected at the engaging locations; and releaseably engaging each of the connecting pieces with the holder for biasing the windscreen wiper device in a less curved position.

2. A windscreen wiper and package combination, comprising:

a wiper blade of flexible material;

a carrier of spring elastic material operatively supporting said wiper blade and self-biasing said wiper blade into a curved shape in a longitudinal direction of said wiper blade;

a pair of connecting pieces disposed at opposite ends of said wiper blade and coupled to said carrier; and a connecting device operatively secured to said carrier for enabling attachment of said windscreen wiper to a wiper arm of a vehicle; and said package comprising an elongated wiper blade holder being relatively stiffer than that of said carrier in the flexing direction of said carrier, said wiper blade holder having a longitudinal profile that is less-curved in comparison to the self-biased curved shape of said carrier-supported wiper blade; and wherein said holder engages said windscreen wiper at least three points along its length including direct releasable engagement with said connecting device and each of said pair of connecting pieces.

3. The combination of claim 2, wherein said wiper blade includes a wiping lip, and wherein said wiping lip is supported out of engagement with said holder.

4. The combination of claim 3, wherein said holder includes a chamber and wherein said wiping lip is received in said channel in spaced relation to a bottom wall of said chamber.

5. A method of supporting a wiper blade device having a flexible wiper strip carried on an elastic pre-curved carrier which self-biases the wiper element into a curved profile in a relaxed state and including a connecting device disposed on the carrier for enabling attachment of the wiper blade device to a wiper arm of a vehicle, said method including providing a holder device with an elongated chamber and pressing the wiper blade device into the chamber causing the wiper blade device to flex toward a straightened condition against the bias force of the carrier and bringing a portion of the holder into releasable snapping direct engagement with the connecting device of the wiper blade device.

\* \* \* \* \*